United States Patent
Tian et al.

(10) Patent No.: US 8,661,105 B2
(45) Date of Patent: Feb. 25, 2014

(54) INTEGRATED VIDEO SERVICE PEER TO PEER NETWORK SYSTEM

(75) Inventors: Hongliang Tian, Shenzhen (CN); Sui Xiao, Shenzhen (CN); Xin Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 985 days.

(21) Appl. No.: 12/672,891

(22) PCT Filed: Dec. 26, 2007

(86) PCT No.: PCT/CN2007/003807
§ 371 (c)(1),
(2), (4) Date: Feb. 9, 2010

(87) PCT Pub. No.: WO2009/021374
PCT Pub. Date: Feb. 19, 2009

(65) Prior Publication Data
US 2011/0029649 A1    Feb. 3, 2011

(30) Foreign Application Priority Data
Aug. 10, 2007    (CN) .......................... 2007 1 0135734

(51) Int. Cl.
G06F 15/16    (2006.01)
G06F 15/173    (2006.01)

(52) U.S. Cl.
USPC .......................................... 709/223; 709/231

(58) Field of Classification Search
None
See application file for complete search history.

(56) References Cited

U.S. PATENT DOCUMENTS

| 8,234,387 | B2 * | 7/2012 | Bradley et al. | ................. 709/229 |
| 2005/0027871 | A1 * | 2/2005 | Bradley et al. | ................. 709/227 |

FOREIGN PATENT DOCUMENTS

| CN | 1604569 A | 4/2005 |
| CN | 1816053 A | 8/2006 |
| CN | 101001312 A | 7/2007 |
| JP | 2005149040 A | 6/2005 |

OTHER PUBLICATIONS

International Search Report for PCT/CN2007/003807 dated Mar. 6, 2008.

(Continued)

*Primary Examiner* — Umar Cheema
(74) *Attorney, Agent, or Firm* — Nixon Peabody LLP; Joseph Bach, Esq.

(57) ABSTRACT

An integrated video service peer to peer network system, includes: a media source system, configured to divide video service data into one or more segments and each of the one or more segments into a plurality of blocks, and to generate a media description file based on segment dividing information and media format information, wherein, each of the plurality of blocks is of a self-description type and comprises a block head and a block body, the block body including media data; a media distribution management system, configured to store media distribution information, wherein, the media distribution information represents the information of the storage status of divided video service data segments at a peer source node and the information of the serving capability status of the peer source node; and a plurality of the peer source nodes, configured to store the video service data, and to transmit the video service data to a service requesting node. With the present invention, the range of sharing can be effectively extended, the usage of the client resources can be optimized, while the provider system and the client system are significantly simplified, so the cost of the operation and maintenance are reduced.

8 Claims, 3 Drawing Sheets

(56) References Cited

OTHER PUBLICATIONS

Examination Report for Chinese Application No. 200710135734.0 dated Apr. 1, 2010.

Liu Feng, et al., "MagicStream: A Video-on-Demand System Based on the P2P Technology", Computer Engineering & Science, vol. 29, No. 4, 2007.

* cited by examiner

INTEGRATED VIDEO SERVICE PEER TO PEER NETWORK SYSTEM

RELATED APPLICATIONS

This Application is a national phase of International Application No. PCT/CN2007/003807, entitled "AN INTEGRATING VIDEO SERVICE PEER TO PEER NETWORKS SYSTEM", which was filed on Dec. 26, 2007, and which claims priority of Chinese Patent Application No. 200710135734.0, filed on Aug. 10, 2007.

FIELD OF THE INVENTION

The present invention relates to communication field, and in particular to an integrated video service peer to peer network system.

BACKGROUND OF THE INVENTION

Due to the fast development of internet and wideband access network, various types of video services, such as download, video-on-demand, live broadcasting, etc., are enabled by employing Peer to Peer network (P2P for short) technology. However, current P2P system generally can only support a single type of service, for example, BT can only support download service, and PPlive can only support live broadcasting service. If a user wants to process more than one type of services, a plurality of client programs has to be installed, and a plurality of systems for supporting these services has to be set up by the service provider, which not only leads to high construction cost and inconvenience for subscriber usage, but also is disadvantageous to effectively utilize the video contents and client resources, thus the overall cost for providing P2P video service is increased.

Current P2P system has been proposed and established aiming at a particular service, and is not unified in view of media storage format, transmission format, transmission mechanism, and media source positioning mechanism, so one system can only provide one kind of service. However, a system which is able to provide various types of services has not been proposed so far.

SUMMARY OF THE INVENTION

The present invention is made upon considering the above problem, thus the main object of the present invention is to provide an integrated video service peer to peer network system.

The integrated video service peer to peer network system according to an embodiment of the present invention comprises:

a media source system, configured to divide video service data into one or more segments and each of the one or more segments into a plurality of blocks, and to generate a media description file based on segment dividing information and media format information, wherein, each of the plurality of blocks is of a self-description type and comprises a block head and a block body, the block body including media data;

a media distribution management system, configured to store the media distribution information, wherein, the media distribution information represents the information of the storage status of divided video service data segments at a peer source node and the information of the serving capability status of the peer source node; and a plurality of the peer source nodes, configured to store the video service data, and to transmit the video service data to a service requesting node.

Wherein, the video service data can comprise live broadcasting video service data, video on demand service data, and video downloading service data.

In particular, the media source system further comprises: a real time processing module, configured to set the blocks adjacent to the broadcasting point in the live broadcasting video service data as a live broadcasting video service data segment, and set only one live broadcasting video service data segment, when the live broadcasting service data is broadcasted to the service requesting node, the blocks in the live broadcasting service data segment is updated in real time; and a non-real time processing module, configured to divide, in a unified way, the video downloading service data and/or the video on demand service data into a plurality of segments and to divide each segment of the video downloading service data and/or the video on demand service data into a plurality of blocks, wherein each of the plurality of blocks is consisted of a block head and a block body, the block body including the media data ordered in time sequence.

Wherein, the aforementioned media data may be video frames and audio frames. When the video downloading service data and/or the video on demand service data are received, the service requesting node combines the received blocks of the video downloading service data and/or the video on demand service data as the segment, and stores, in the unit of the segment, the video downloading service data and/or the video on demand service data the.

In addition, in the system, the service requesting node acquires, through inquiring the media distribution management system, the information of the peer source node having the video service data segments needed by the service requesting node the.

And, the peer source node may further comprise: a change notification module, configured to notify, when the peer source node changes, the media distribution management system the information of the change, so that the media distribution management system updates the media distribution data based on the change. Wherein, the change at least comprises: the peer source node going on-line or off-line, the change of the segment dividing of the video service data in the memory and the disk of the peer source node, and the change of the serving capability of the peer source node.

In addition, the information contained in the block head comprises: a content ID contained in the block, a segment ID to which the block belongs, the number of effective blocks in the block, and a timestamp.

In addition, the peer source node stores the video service data in the unit of the segment.

By the above said technical scheme of the present invention, the system can support a plurality of video service types, such as video on demand, live broadcasting, downloading, etc., which makes two clients using different services be able to share video contents and provide services to each other, which effectively extends the range of sharing, and optimizes the usage of client resources, while the provider system and the client system are significantly simplified, and the cost of the operation and maintenance are reduced.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention, wherein.

DETAILED DESCRIPTION OF EMBODIMENTS

System Embodiment

In the embodiment, an integrated video service peer to peer network system is provided.

Figure 1:
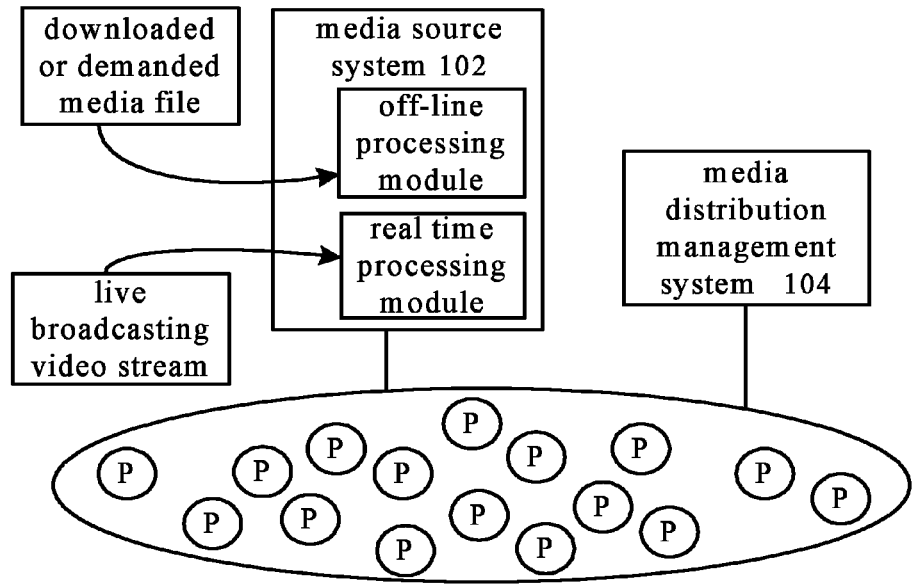
FIG. 1 is a block diagram of the integrated video service peer to peer network system according to an embodiment of the present invention.

As shown in FIG. 1, the integrated video service peer to peer network system according to the embodiment of the present invention comprises: a media source system 102 configured to divide video service data into one or more segments and each of the one or more segments into a plurality of blocks, and to generate a media description file based on segment dividing information and media format information, wherein, each of the plurality of blocks is of a self-description type and comprises a block head and a block body, the block body including media data, thus when being received, different blocks can be received at different source nodes; a media distribution management system 104 configured to store the media distribution information, wherein, the media distribution information represents the information of the storage status of the divided video service data segments at a peer source node and the information of the serving capability status of the peer source node; and a plurality of the peer source nodes P configured to store the video service data, and to transmit the video service data to a service requesting node.

Figure 2:
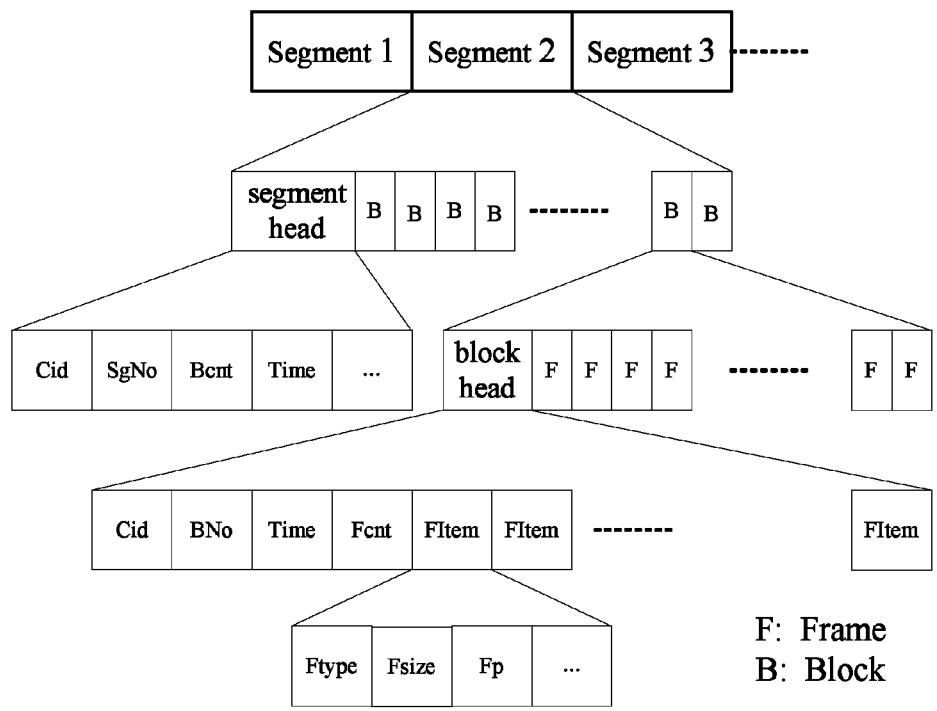
FIG. 2 is a schematic view of dividing and packaging the video service data according to an embodiment of the present invention.

FIG. 2 is a schematic view of dividing and packaging the video service data according to the embodiment of the present invention. As shown in FIG. 2, each segment may comprise a segment head and a data part, in which the data part is consisted of a fixed number of blocks. The segment head comprises domains such as a content ID, a segment ID, the number of effective blocks, and a beginning timestamp, etc. A block contains a block head and a block body (data domain), in which the block body is formed of a series of audio/video frames ordered in time sequence. The block head comprises domains such as a content ID, the number of effective frames, a beginning timestamp, and a frame description item array, etc. Wherein, each frame description item comprises a frame type field, a frame size field, and a frame storage pointer field, etc. The content of the media description file mainly comprises a media segment beginning ID, the number of segments, and the description information of other media format.

Moreover, the above said video service data may comprise live broadcasting video service data, video on demand service data, and video downloading service data. The difference in service types (live broadcasting, video on demand, downloading) can represent the difference in the sequence of obtaining the media data, the time of selecting and the storage type. For example, video on demand service generally requires to sequentially obtain the media segments, whereas video downloading service does not have to sequentially obtain the media segments and also does not have to sequentially obtain the block data in the segment; in addition, the data of live broadcasting service generally can only be cached in memory, while the video on demand and downloading can not only be cached in memory but also be stored in disk.

In particular, the media source system 102 can further comprise a real time processing module, configured to set the blocks adjacent to the broadcasting point in the live broadcasting video service data as a live broadcasting video service data segment, and set only one live broadcasting video service data segment, when the live broadcasting service data is broadcasted to the service requesting node, the blocks in the live broadcasting service data segment is updated in real time; and a non-real time processing module, configured to divide, in a unified way, the video downloading service data and/or the video on demand service data into a plurality of segments and to divide each segment of the video downloading service data and/or the video on demand service data into a plurality of blocks, wherein each of the plurality of blocks is consisted of a block head and a block body, the block body including the media data ordered in time sequence. Wherein, the aforementioned media data may be video frames and audio frames.

And when the video downloading service data and/or the video on demand service data are received, the service requesting node combines the received blocks of the video downloading service data and/or the video on demand service data as the segment, and stores, in the unit of the segment, the video downloading service data and/or the video on demand service data.

Figure 3:
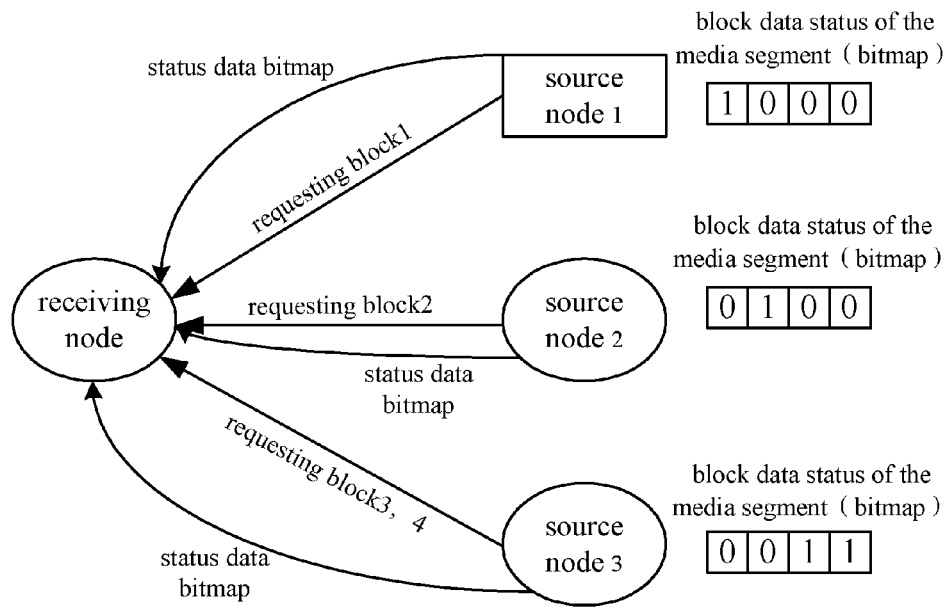
FIG. 3 is a schematic view of circumstance in which one receiving node receives video data from a plurality of source nodes according to an embodiment of the present invention.

FIG. 3 shows the circumstance in which one receiving node receives video data from a plurality of source nodes. As shown in FIG. 3, before the block transmission, the receiving node (i.e., the aforementioned service requesting node, which will be referred to as a client) obtains the status data of the blocks of the media segment described using bit array from the source node (also referred to as a source client), wherein each bit represents a block, 1 denotes that the source client has the data block, and 0 denotes that the source client does not have the data block. After having obtained the status data of media blocks of a plurality of source clients, the receiving client requests data from each of the source clients block by block.

Figure 4:
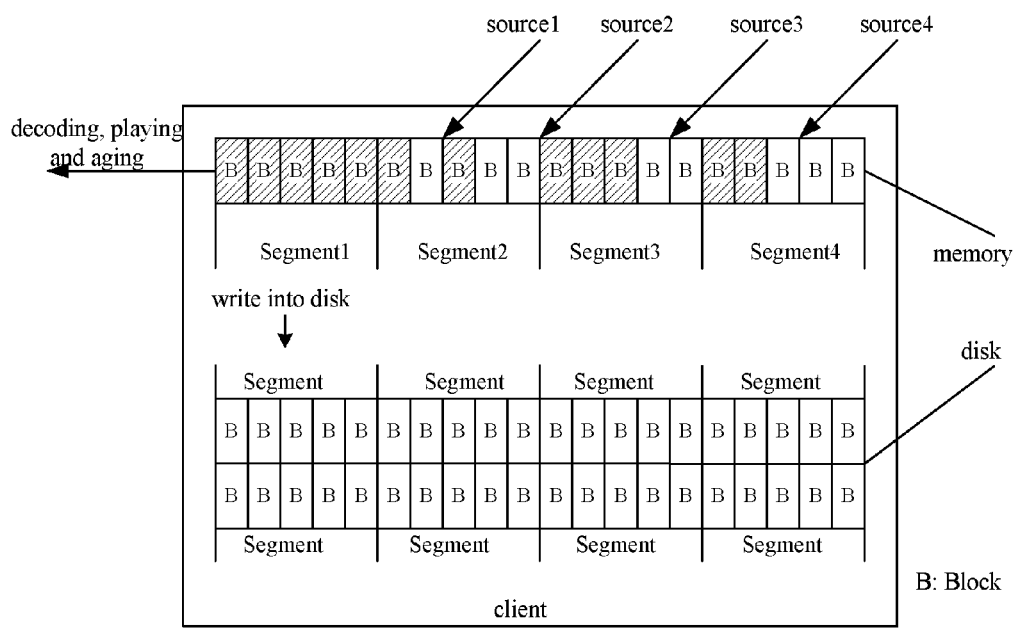
FIG. 4 is a schematic view of the format in which video data is stored by the receiving node according to an embodiment of the present invention.

FIG. 4 shows an example of the storage format of the video data at the receiving node. Generally, there are two types of storage medium, i.e., memory and disk. Preferably, the live broadcasting data block is cached in a memory and rolling aged; while the video on demand and downloading data are also first cached in memory, and then stored in a disk after all data of a complete segment are cached. By this way, it is enabled that the receiving and playing function of the client can be completely separated from the external service providing function, i.e., no matter which service is being used or which media is being played by the client currently, both the media in the memory and the media in the disk can provide services to other clients.

Figure 5:
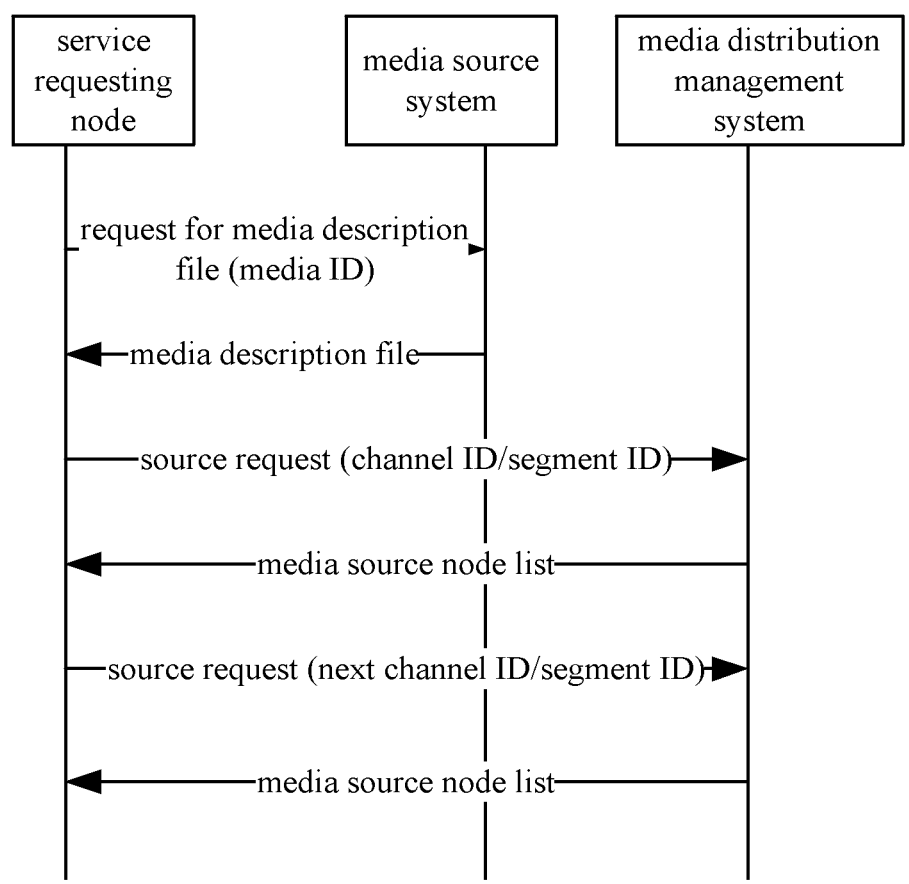
FIG. 5 is a message flow chart of the source node positioning process in the integrated video service data transmission system according to an embodiment of the present invention.

FIG. 5 shows the message flow chart of media source positioning. As shown in FIG. 5, in the system, the service requesting node acquires, through inquiring the media distribution management system 104, the information of one or more peer source node having the video service data segments needed by the service requesting node, the service requesting node can obtain media data from the corresponding peer source node/nodes in combination with the segment dividing information of the video service data.

The media source system 102 and the media distribution management system 104 can use centralized deployment or distributed deployment according to the particular circumstance.

Further, the peer source node may further comprise: a change notification module, configured to notify, when the peer source node changes, the media distribution management system the information of the change, so that the media distribution management system updates the media distribution data based on the change. Wherein, the change at least comprises: the peer source node going on-line or off-line, the change of the segment dividing of the video service data in the memory and the disk of the peer source node, and the change of the serving capability of the peer source node.

By the system mentioned above, live broadcasting video, video on demand and downloading video service can be established on the same base P2P platform, on which, the media packaging format, the media source positioning mechanism, the media data transmission mechanism, and the client media storage mechanism can be shared.

In addition, when the peer source node goes on-line or off-line, when the segment dividing of the video service data in the memory and the disk of the peer source node changes, and/or when the serving capability of the peer source node changes, the following processing is further performed, the peer source node notifies the media distribution management system the information of the change, so that the media distribution management system updates the media distribution data based on the change.

All in all, with the above mentioned technical scheme of the present invention, a plurality of P2P video service types including video on demand, live broadcasting, downloading, etc. can be supported simultaneously. A P2P system for a plurality of video service types can support video on demand, live broadcasting, downloading at the same time. This system thus enables two clients using different services to share video contents and provide services to each other, thus the range of sharing can be effectively extended, the usage of the client resources can be optimized, while the provider system and the client system are significantly simplified, so the cost of the operation and maintenance are reduced.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

The invention claimed is:

1. An integrated video service peer to peer network system comprises:
a media source computer system, configured to divide video service data into one or more segments and each of said one or more segments into a plurality of blocks, and to generate a media description file based on segment dividing information and media format information, wherein, each of said plurality of blocks is of a self-description type and comprises a block head and a block body, the said block body including media data;
a media distribution management computer system including a memory device and configured to store said media distribution information in said memory device, wherein, said media distribution information represents the information of the storage status of divided video service data segments at a peer source node computer and the information of the serving capability status of said peer source node computer; and
a plurality of said peer source node computers, configured to store said video service data, and to transmit said video service data to a service requesting node;
wherein said video service data comprises live broadcasting video service data, video on demand service data, and video downloading service data; and,
wherein, said media source computer system further comprises:
a real time processing module, configured to set the blocks adjacent to the broadcasting point in said live broadcasting video service data as a live broadcasting video service data segment, and set only one live broadcasting video service data segment, when said live broadcasting service data is broadcasted to said service requesting node, the blocks in said live broadcasting service data segment is updated in real time; and
a non-real time processing module, configured to divide, in a unified way, said video downloading service data and/or said video on demand service data into a plurality of segments and to divide each segment of said video downloading service data and/or said video on demand service data into a plurality of blocks, wherein each of said plurality of blocks is consisted of a block head and a block body, said block body including said media data ordered in time sequence.

2. The integrated video service peer to peer network system according to claim 1, wherein, said media data are video frames and audio frames.

3. The integrated video service peer to peer network system according to claim 1, wherein, when said video downloading service data and/or said video on demand service data are received, said service requesting node combines the received blocks of said video downloading service data and/or said video on demand service data as said segment, and stores, in the unit of said segment, said video downloading service data and/or said video on demand service data.

4. The integrated video service peer to peer network system according to anyone of claims 1, 2, and 3, wherein, said service requesting node acquires, through inquiring said media distribution management computer system, the information of said peer source node computer having said video service data segments needed by said service requesting node.

5. The integrated video service peer to peer network system according to anyone of claims 1, 2, and 3, wherein, said peer source node computer further comprises: a change notification module, configured to notify, when said peer source node computer changes, said media distribution management computer system the information of the change, so that said media distribution management computer system updates said media distribution data based on said change.

6. The integrated video service peer to peer network system according to claim 5, wherein, said change at least comprises: said peer source node computer going on-line or off-line, the change of the segment dividing of said video service data in the memory and the disk of said peer source node computer, and the change of the serving capability of said peer source node computer.

7. The integrated video service peer to peer network system according to anyone of claims 1, 2, and 3, wherein, the information contained in said block head comprises: a content ID contained in said block, a segment ID to which said block belongs, the number of effective blocks in said block, and a timestamp.

8. The integrated video service peer to peer network system according to anyone of claims 1, 2, and 3, wherein, said peer source node computer stores said video service data in the unit of said segment.

* * * * *

UNITED STATES PATENT AND TRADEMARK OFFICE
CERTIFICATE OF CORRECTION

PATENT NO. : 8,661,105 B2  Page 1 of 1
APPLICATION NO. : 12/672891
DATED : February 25, 2014
INVENTOR(S) : Tian et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 987 days.

Signed and Sealed this

Twenty-ninth Day of September, 2015

Michelle K. Lee
*Director of the United States Patent and Trademark Office*